(12) United States Patent
Ye et al.

(10) Patent No.: US 11,924,120 B2
(45) Date of Patent: Mar. 5, 2024

(54) INTERNET OF THINGS DATA TRANSMISSION METHOD AND SYSTEM

(71) Applicant: ENN DIGITAL ENERGY TECHNOLOGY CO., LTD, Beijing (CN)

(72) Inventors: Xianliang Ye, Beijing (CN); Zhenhua Wang, Beijing (CN); Xuhui Chen, Beijing (CN); Kaiji Jiang, Beijing (CN)

(73) Assignee: ENN DIGITAL ENERGY TECHNOLOGY CO., LTD, Beijing (CN)

( * ) Notice: Subject to any disclaimer, the term of this patent is extended or adjusted under 35 U.S.C. 154(b) by 282 days.

(21) Appl. No.: 17/412,250

(22) Filed: Aug. 25, 2021

(65) Prior Publication Data

US 2021/0385174 A1 Dec. 9, 2021

Related U.S. Application Data

(63) Continuation of application No. PCT/CN2020/103655, filed on Jul. 23, 2020.

(30) Foreign Application Priority Data

Dec. 10, 2019 (CN) .......................... 201911260568.6

(51) Int. Cl.
*H04L 49/90* (2022.01)
*G16Y 10/75* (2020.01)
*H04L 7/00* (2006.01)

(52) U.S. Cl.
CPC .............. *H04L 49/90* (2013.01); *G16Y 10/75* (2020.01); *H04L 7/0008* (2013.01)

(58) Field of Classification Search
CPC ...... G06F 11/2035; H04L 7/00; H04L 12/861; H04W 76/007; H04W 4/22; H04W 4/12; H04W 8/005; H04W 4/008; G06Q 50/30; H04Q 9/00
See application file for complete search history.

(56) References Cited

U.S. PATENT DOCUMENTS

| | | | |
|---|---|---|---|
| 2018/0219654 A1* | 8/2018 | Chen | H04W 72/0446 |
| 2019/0182866 A1* | 6/2019 | Li | H04W 74/0808 |
| 2020/0028540 A1* | 1/2020 | Teboulle | H04B 3/542 |

* cited by examiner

*Primary Examiner* — Iqbal Zaidi

(57) ABSTRACT

Disclosed are an Internet of Things data transmission data and system. The method comprises a downlink transmission step: obtaining first downlink data delivered by an Internet of Things platform; parsing the first downlink data to obtain a target meter of a metering task and a forwarding priority in a first packet; obtaining second downlink data; adding the second downlink data to an asynchronous delivery queue according to the forwarding priority; and delivering the second downlink data to the target meter according to the asynchronous delivery queue, so that the target meter completes the metering task. The present method makes full use of concentrators as intermediate devices while maintaining the integrity of core task data, lowers the channel requirement due to asynchronous execution and is especially suitable for periodic metering tasks.

12 Claims, 7 Drawing Sheets

INTERNET OF THINGS DATA TRANSMISSION METHOD AND SYSTEM

CROSS REFERENCE TO RELATED APPLICATIONS

The present application is a Continuation Application of PCT Application No. PCT/CN2020/103655 filed on Jul. 23, 2020, which claims the benefit of Chinese Patent Application No. 201911260568.6 filed on Dec. 10, 2019. All the above are hereby incorporated by reference in their entirety.

TECHNICAL FIELD

The present disclosure relates to the field of Internet of Things data collection technologies, and in particular, to an Internet of Things data transmission method and system.

BACKGROUND

The Internet of Things (IOT) collects, in real time, any object or process required to be monitored, connected and to interact and collects acoustic, optical, thermal, electrical, mechanical, chemical, biological, location and other information required through a network of apparatuses and technologies such as various information sensors, RFID technologies, global positioning systems, infrared sensors, and laser scanners. Devices that collect the acoustic, optical, thermal, electrical, mechanical, chemical, biological, and location information are collectively called meters, and various meters in a fixed region perform data communication with an Internet of Things platform through concentrators.

Since different meters may be provided with a plurality of transmission protocols, how an Internet of Things system is compatible with the communication between different transmission protocols is the key to building the Internet of Things. There are two main data transmission manners for the existing Internet of Things.

In the first manner, the Internet of Things platform only groups and parses packets for a certain communication protocol and the concentrator is responsible for the work of compatibility with a plurality of protocols, such as MODBUSTCP, IEC104, MQTT and other framework protocols, which strengthens a function of the concentrator, but causes the communication between the Internet of Things platform and the concentrator to be separated from the communication between the concentrator and the meter; as a result, a timestamp of data taken from the concentrator is not accurate, and the Internet of Things platform is shielded from an underlying meter, and the concentrator and the meter therebelow have insufficient remote upgrade capability, which is not good for function expansion.

In the second manner, the function of the concentrator is weakened, the Internet of Things platform, the concentrator and the meter are synchronously interconnected, and the concentrator acts only as a hardware interface for transparent forwarding of data packets, such as a Q/GDW376.1 protocol. A header and a trailer of a protocol packet are packaged with communication content, so that the Internet of Things platform can communicate directly with the underlying meter by using an original packet of the meter. Disassembly of different protocols of the meter is accomplished by the Internet of Things platform, but the synchronous collection manner has a high requirement on the real-time performance of the communication channel, and the collection is prone to error failure. In particular, each periodic metering task has to be actively initiated by the Internet of Things platform, and the role of the concentrator is shelved.

Technical Problem

An objective of embodiments of the present disclosure is to provide an Internet of Things data transmission method and system, which not only solves the problem of transmission separation between upper and lower layers in the prior art, but also solves the problem of the high requirement of synchronous transmission on a channel.

Technical Solution

In view of the above, the embodiments of the present disclosure provide an Internet of Things data transmission method and system, which designs an Internet of Things platform, a concentrator and an Internet of things system including the Internet of Things platform, the concentrator and a target meter, not only overcomes the problem of transmission separation between upper and lower layers in the prior art, but also solves the problem of the high requirement of synchronous transmission on a channel.

In a first aspect of the embodiments of the present disclosure, an Internet of Things data transmission method is provided, including a downlink transmission step, the downlink transmission step including:

obtaining first downlink data delivered by an Internet of Things platform, the first downlink data including a first packet generated from a first packet format, a communication protocol packet of a target meter and a metering task;

parsing the first downlink data to obtain a target meter of the metering task and a forwarding priority in the first packet;

obtaining second downlink data, the second downlink data including the communication protocol packet of the target meter and the metering task;

adding the second downlink data to an asynchronous delivery queue according to the forwarding priority; and delivering the second downlink data to the target meter according to the asynchronous delivery queue, so that the target meter completes the metering task.

In a second aspect of the embodiments of the present disclosure, an Internet of Things data transmission method is provided, including a downlink transmission step and an uplink transmission step, wherein the downlink transmission step includes:

obtaining a metering task;

performing packet format processing on the metering task according to a first packet format and a communication protocol of a target meter to generate first downlink data, the first downlink data including a first packet generated from the first packet format, a communication protocol packet of the target meter and the metering task; and delivering the first downlink data to a concentrator, so that the concentrator obtains second downlink data by parsing and sends the second downlink data to the corresponding target meter, wherein the second downlink data includes the communication protocol packet of the target meter and the metering task; and the uplink transmission step includes:

obtaining a second uplink data uploaded by the concentrator;

the second uplink data including the first packet generated from the first packet format, the communication protocol packet of the target meter and a metering task result.

In a third aspect of the embodiments of the present disclosure, an Internet of Things data transmission system is provided, including an Internet of Things platform, M concentrators and N meters, wherein M and N are natural numbers, and the Internet of Things platform includes:

a first downlink data generation module configured to perform packet format processing on a metering task according to a first packet format to generate first downlink data;

the first downlink data including a first packet generated from the first packet format, a communication protocol packet of a target meter and the metering task; and a first downlink data delivery module configured to deliver the first downlink data; and the concentrator includes:

a first downlink data obtaining module configured to obtain the first downlink data delivered by the Internet of Things platform;

a first downlink data parsing module configured to parse the first downlink data to obtain a target meter of the metering task and a forwarding priority;

a second downlink data obtaining module configured to obtain second downlink data, the second downlink data including the communication protocol packet of the target meter and the metering task;

a second downlink data delivery module configured to send the second downlink data to the corresponding target meter according to the forwarding priority;

a first uplink data obtaining module configured to obtain first uplink data uploaded by the target meter, the first uplink data including the communication protocol packet of the target meter and a metering task result;

a second uplink data generation module configured to generate second uplink data, the second uplink data including the first packet and the first uplink data; and a second uplink data reporting module configured to report the second uplink data to the Internet of Things platform.

Beneficial Effects

Compared with the prior art, the embodiments of the present disclosure have at least the following beneficial effects: in the embodiments of the present disclosure, the concentrator queues different metering tasks according to priorities of the metering tasks and performs asynchronous execution. In this way, the concentrator can autonomously complete a periodic task required to be executed repeatedly and then report it actively, and the Internet of Things platform is not required to initiate a task regularly each time, which reduces the workload of the Internet of Things platform, makes full use of the concentrator as an intermediate device while maintaining the integrity of core task data, and is not prone to errors. Moreover, the channel requirement may also be lowered due to the asynchronous execution, and this method is especially suitable for periodic metering tasks.

BRIEF DESCRIPTION OF THE DRAWINGS

In order to more clearly illustrate the technical solutions in the embodiments of the present disclosure, the accompanying drawings used in the description of the embodiments or the prior art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION

In the following description, for the purpose of illustration instead of limitation, specific details such as a particular system structure and a technology are provided to make the present disclosure understood thoroughly. However, it should be understood by those skilled in the art that the present disclosure can also be implemented in other embodiments without the specific details. In other cases, detailed descriptions of well-known systems, apparatuses, circuits and methods are omitted, so that the present disclosure is described without being impeded by unnecessary details. All other embodiments obtained by those of ordinary skill in the art based on the embodiments of the present disclosure described fall within the protection scope of the present disclosure. Unless otherwise specified, the technical means used in the embodiments are conventional means known to those skilled in the art.

It is to be understood that, when used in the specification and the appended claims, the term "include/comprise" specify the presence of the described features, integers, steps, operations, elements and/or components, but may not exclude the presence or addition of one or more of other features, integers, steps, operations, elements, components and/or combinations thereof.

It is also to be understood that, the terms used in the specification of the present application are intended only to describe specific embodiments and are not intended to limit the present application. As used in the specification of the present application and the appended claims, the singular forms of "a/an", "one", and "the" are intended to include plural forms, unless otherwise clearly specified by the context.

It is to be further understood that, the term "and/or" used in the specification of the present application and the appended claims refers to any and all possible combinations of one or more of relevant listed items and includes these combinations.

As used in the specification of the present application and the appended claims, the term "if" may be interpreted as "when", or "once", or "in response to a determination" or "in response to detection of" depending on the context. Similarly, depending on the context, the phrase "if it is determined that" or "if [a described condition or event] is detected" may be interpreted as "once it is determined that", or "in response to a determination", or "once [a described condition or event] is detected", or "in response to a case where [a described condition or event] is detected".

In order to illustrate the technical solutions described in the present disclosure, specific embodiments are provided below.

Embodiment 1

Figure 8:
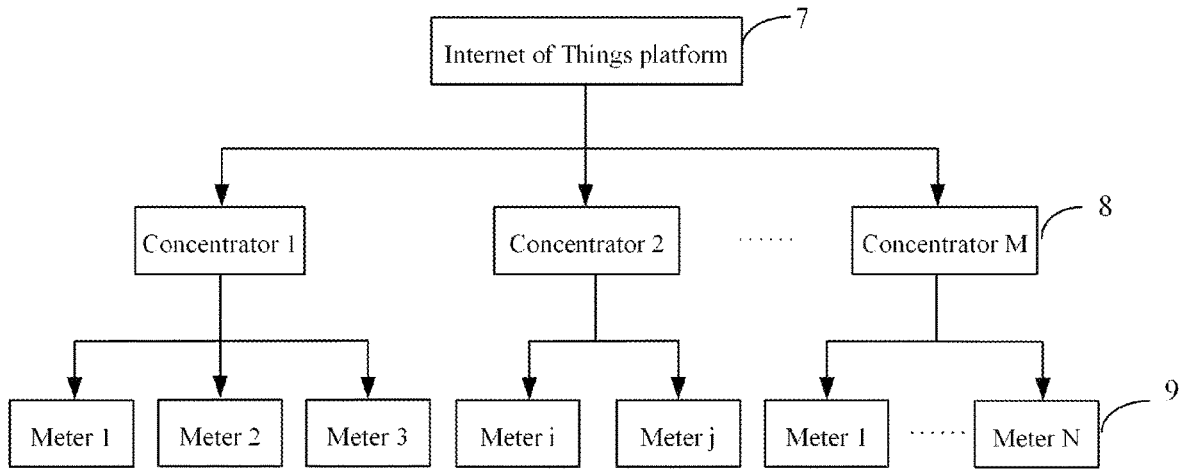
FIG. 8 is a schematic diagram of an Internet of Things transmission system according to an embodiment of the present disclosure.

This embodiment provides an Internet of Things data transmission system, which, as shown in FIG. 8, includes an Internet of Things platform 7, M concentrators 8 and N meters 9, wherein M and N are natural numbers.

Figure 9:
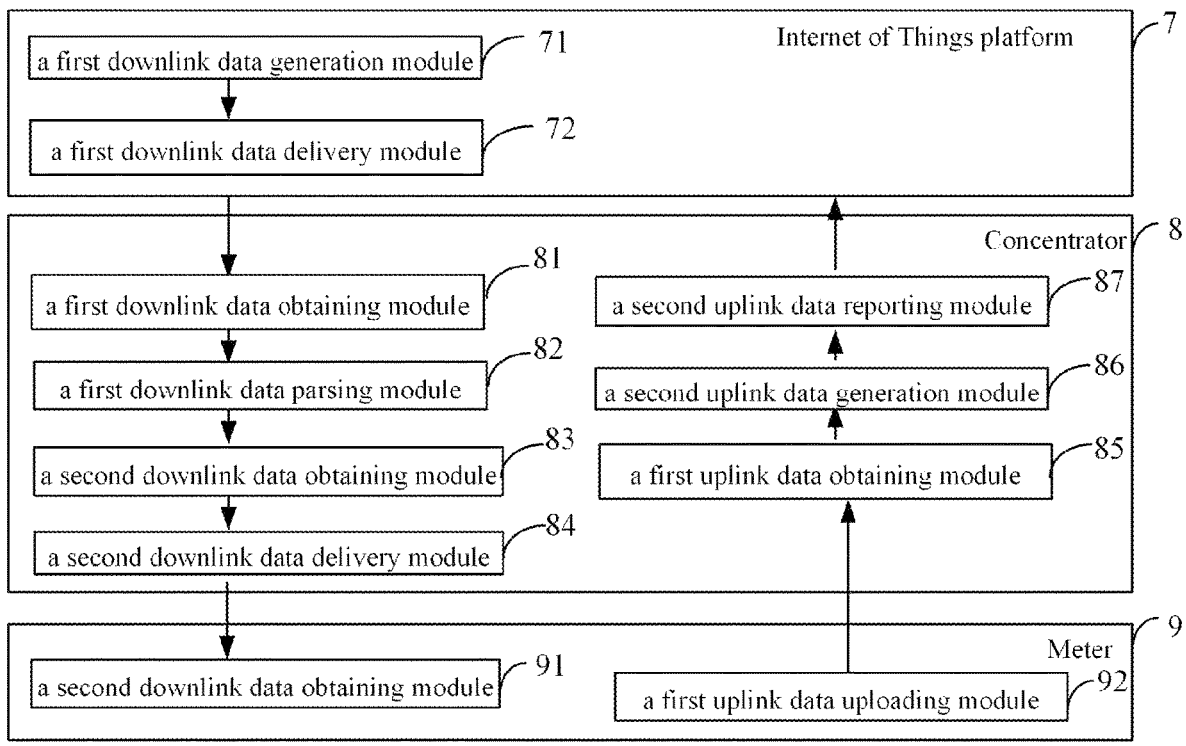
FIG. 9 is a schematic structural diagram of the Internet of Things transmission system according to Embodiment 1 of the present disclosure.

Referring to FIG. 9, the Internet of Things platform 7 includes a first downlink data generation module 71 and a first downlink data delivery module 72. The first downlink data generation module 71 is configured to perform packet format processing on a metering task according to a first packet format to generate first downlink data. The first downlink data delivery module 72 is configured to deliver the first downlink data.

The concentrator 8 includes a first downlink data obtaining module 81, a first downlink data parsing module 82, a second downlink data obtaining module 83, a second downlink data delivery module 84, a first uplink data obtaining module 85, a second uplink data generation module 86 and a second uplink data reporting module 87. The first downlink data obtaining module 81 is configured to obtain the first downlink data delivered by the Internet of Things platform 7. The first downlink data parsing module 82 is configured to parse the first downlink data to obtain a target meter of the metering task and a forwarding priority. The second downlink data obtaining module 83 is configured to obtain second downlink data. The second downlink data delivery module 84 is configured to send the second downlink data to the corresponding target meter according to the forwarding priority. The first uplink data obtaining module 85 is configured to obtain first uplink data uploaded by the target meter. The second uplink data generation module 86 is configured to generate second uplink data. The second uplink data reporting module 87 is configured to report the second uplink data to the Internet of Things platform 7.

In this embodiment, the meter 9 includes a second downlink data obtaining module 91 and a first uplink data uploading module 92. The second downlink data obtaining module 91 is configured to obtain the second downlink data delivered by the concentrator 8. The first uplink data uploading module 92 is configured to upload the first uplink data to the concentrator 8.

A data transmission method in this embodiment is described below.

Figure 5:
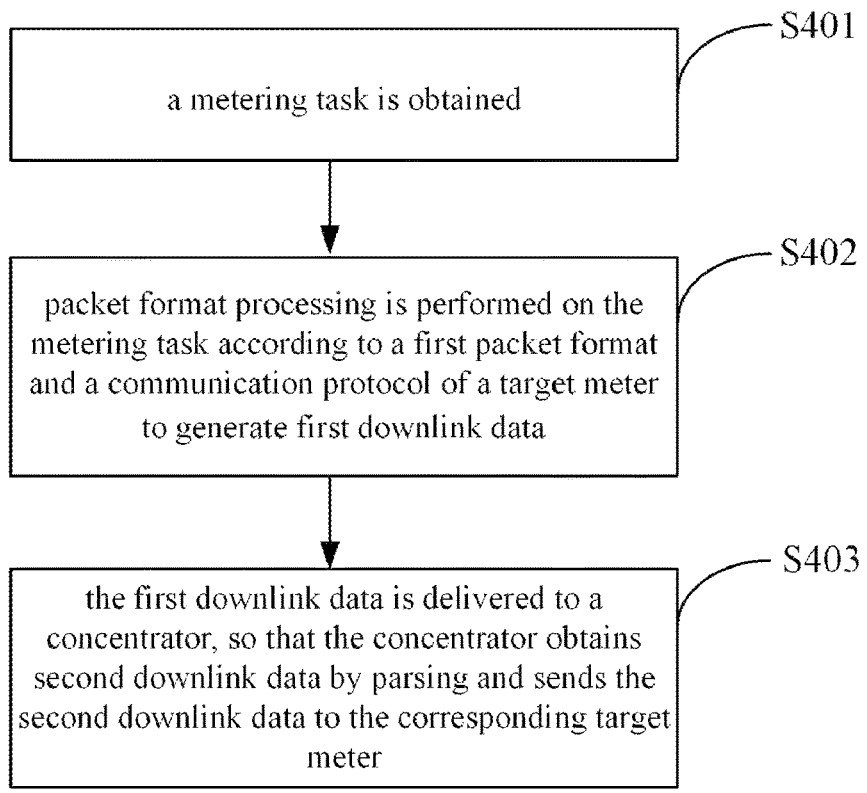
FIG. 5 is a schematic complete implementation flowchart of a downlink transmission step of the Internet of Things platform according to an embodiment of the present disclosure.

Firstly, the execution of specific data transmission is described from the aspect of the Internet of Things platform 7. That is, an Internet of Things data transmission method performed by the Internet of Things platform 7 includes a downlink transmission step and an uplink data transmission step. The downlink transmission step may be obtained with reference to FIG. 5, including the following steps.

In step S401, a metering task is obtained.

In step S402, packet format processing is performed on the metering task according to a first packet format and a communication protocol of a target meter to generate first downlink data, the first downlink data including a first packet generated from the first packet format, a communication protocol packet of the target meter and the metering task.

In step S403, the first downlink data is delivered to a concentrator 8, so that the concentrator 8 obtains second downlink data by parsing and sends the second downlink data to the corresponding target meter, wherein the second downlink data includes the communication protocol packet of the target meter and the metering task.

Preferably, in this embodiment, the first packet format includes: a number of tasks in a present frame and a first data unit format for each metering task, and the first data unit format includes: a task number, a task flag, a forwarding priority, a report flag, a storage depth, a task start time, a task cycle attribute, a task cycle interval, a task end time, a communication protocol type, a rule option, an estimated task answer length, a task packet length and task packet content.

In this embodiment, the task flag indicates a case where a task is required to be executed. Preferably, "00H" indicates that the task cannot be executed, "55H" indicates that the task is enabled, "AAH" indicates that the task is stopped, and other values indicate that the task is invalid. The task is deleted when the task is invalid.

The forwarding priority is a sequence in which the task is executed in an asynchronous queue of the concentrator. Preferably, "00" indicates the lowest priority.

The report flag indicates a state reported after the task is executed. Preferably, "0" is set to Not report, "1" is set to Immediately report after completion of the execution of the task, "2" is set to Report unreported tasks daily, and "3" is set to Report unreported tasks per hour. A report format is AFN=0D, F306.

The storage depth preferably ranges from 0 to 255, indicating storage of recent task execution results. The value of "0" indicates storage of data in recent 3 days.

The task start time indicates a start time when the task is required to be executed. Preferably, in the setting of the execution of the task, "99-99-9999:99" indicates that the current time is used as a reference; otherwise, a specified time is used as a reference for periodic execution. When an invalid time point exists in the periodic execution, no task is executed in this cycle. In the setting of alignment of the task start time, if the task start time is 1 o'clock, a task execution cycle is once an hour, and task execution results, when stored, are marked as "01:00", "02:00", "03:00" . . . and so on. "00" indicates a wildcard, which is valid for year, month and day, indicating yearly, monthly, daily respectively.

The task cycle attribute indicates a time unit of periodic task execution, preferably including year, month, day, hour, minute, and second, as shown in Table 3.

The task cycle interval is a specific interval value after the setting of the task cycle attribute, preferably in a value range of 0 to 255. The value of "0" indicates that the task is executed only once.

The task end time indicates the last time when the task is executed; that is, the execution of the task is not terminated until the end time of the task. Preferably, it is set that "99-99-9999:99" indicates that the task is not terminated; "00" indicates a wildcard, which is valid for year, month and day, indicating yearly, monthly, daily respectively.

The communication protocol type is a communication protocol of a target meter. Preferably, it is set that "00H" is a transparent protocol, "01H" is DL/T 645-1997, "02H" is DL/T 645-2007, "03H" is DL/T698.45, and others are extensible.

The rule option is a description of alternate options.

The estimated task answer length is an answer time interval from a time when the Internet of Things platform delivers a task to a time when the target meter finally receives the task, which is set by the Internet of Things platform according to a requirement of the task.

The task packet length is a data length of task content.

The task packet content is the metering task.

In this embodiment, specific format settings of the first packet format are shown in Table 1:

TABLE 1

| Data content | Data format | Number of |
|---|---|---|
| Number of tasks in a present frame | BIN | 1 |
| First task number | BIN | 1 |
| Task flag | BIN | 1 |
| Forwarding priority | BIN | 1 |
| Report flag | BIN | 1 |
| Storage depth | BIN | 1 |
| Task start time | See table 2 | 5 |
| Task cycle attributed | See table 3 | 1 |
| Task cycle interval | BIN | 1 |
| Task end time | See table 2 | 5 |
| Communication protocol type | BIN | 1 |
| Rule option | BS16 | 2 |
| Estimated task answer length | BIN | 1 |
| Task packet length | BIN | 1 |
| Task packet content | BIN | L1 |
| ... | ... | ... |
| $m^{th}$ task number | BIN | 1 |
| Task flag | BIN | 1 |
| Forwarding priority | BIN | 1 |
| Report flag | BIN | 1 |
| Storage depth | BIN | 1 |
| Task start time | See table 2 | 5 |
| Task cycle attributed | See table 3 | 1 |
| Task cycle interval | BIN | 1 |
| Task end time | See table 2 | 5 |
| Communication protocol type | BIN | 1 |
| Rule option | BS16 | 2 |
| Estimated task answer length | BIN | 1 |
| Task packet length | BIN | 1 |
| Task packet content | BIN | L1 |

BIN indicates binary code, BS16 indicates an independent bit combination with a length of 16, and L1 indicates a length of user data.

Table 2 described in Table 1 is as follows:

TABLE 2

| Byte name | Byte format | | | | | | | |
|---|---|---|---|---|---|---|---|---|
| | D7 | D6 | D5 | D4 | D3 | D2 | D1 | D0 |
| Minute | Ten-bit BCD code | | | | Ten-bit BCD code | | | |
| Hour | Ten-bit BCD code | | | | Ten-bit BCD code | | | |
| Day | Ten-bit BCD code | | | | Ten-bit BCD code | | | |

TABLE 2-continued

| Byte name | Byte format | | | | | | | |
|---|---|---|---|---|---|---|---|---|
| | D7 | D6 | D5 | D4 | D3 | D2 | D1 | D0 |
| Month | Ten-bit BCD code | | | | Ten-bit BCD code | | | |
| Year | Ten-bit BCD code | | | | Ten-bit BCD code | | | |

Table 3 described in Table 1 is as follows:

TABLE 3

| n | Cycle flag |
|---|---|
| 0 | Second |
| 1 | Minute |
| 2 | Hour |
| 3 | Day |
| 4 | Month |
| 5 | Year |
| Other | Alternate |

In this embodiment, the Internet of Things platform 7 passively waits for the concentrator 8 to upload data, and the uplink transmission step includes the following steps.

In step S500, second uplink data uploaded by the concentrator 8 is obtained.

The second uplink data includes the first packet generated from the first packet format, the communication protocol packet of the target meter and a metering task result.

Figure 1:
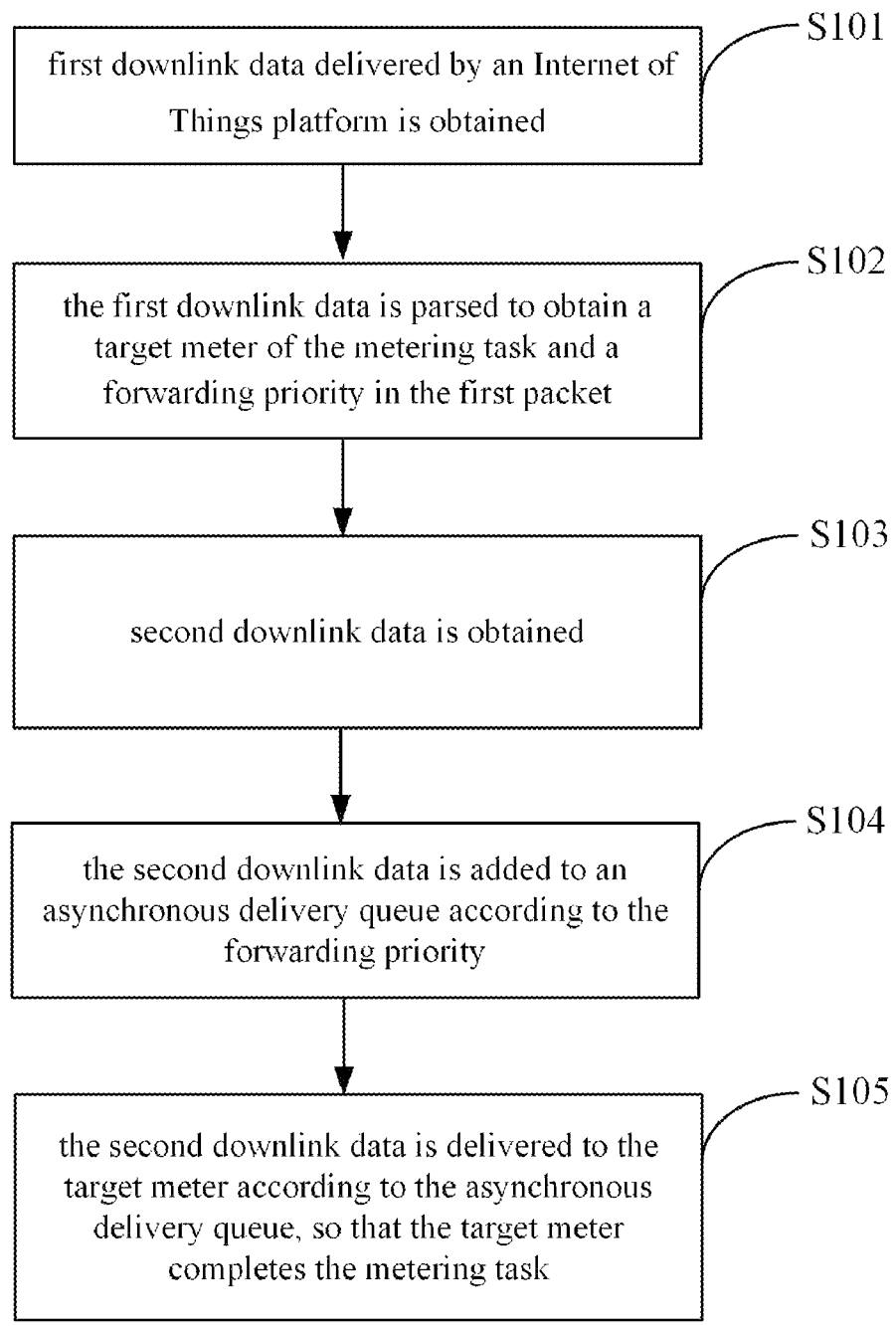
FIG. 1 is a schematic implementation flowchart of a downlink transmission step of a concentrator according to an embodiment of the present disclosure.

Next, the execution of specific data transmission is described from the aspect of the concentrator 8. That is, an Internet of Things data transmission method performed by the concentrator 8 includes a downlink transmission step. Referring to FIG. 1, the downlink transmission step includes the following steps.

In step S101, first downlink data delivered by an Internet of Things platform 7 is obtained, the first downlink data including a first packet generated from a first packet format, a communication protocol packet of a target meter and a metering task.

In step S102, the first downlink data is parsed to obtain a target meter of the metering task and a forwarding priority in the first packet.

In step S103, second downlink data is obtained, the second downlink data including the communication protocol packet of the target meter and the metering task.

In step S104, the second downlink data is added to an asynchronous delivery queue according to the forwarding priority.

In step S105, the second downlink data is delivered to the target meter according to the asynchronous delivery queue, so that the target meter completes the metering task.

In this embodiment, transparent transmission of upper and lower layers is performed still in the manner of packaging data to be processed by the target meter with a particular packet format in the prior art, the metering task to be executed by the target meter and corresponding different communication protocols are regarded as a data whole, that is, the second downlink data including the communication protocol packet of the target meter and the metering task. The concentrator is not required to process the data whole but parses and forwards only a particular packet packaged outside, that is, the first packet. The core task data is complete and not easy to be affected during the transmission, which can greatly reduce an error rate during the transmission. However, the existing synchronous transparent transmission has a high requirement on the channel, and required packet information such as a port, a baud rate and verification is overwritten over the task data. Therefore, if the Internet of Things platform times out or the concentrator times out, the task may fail. In terms of hardware technologies, advantages of common field upstream GPRS/CDMA and downstream carrier channels are not in the real-time performance of single communication. At the same time, a synchronization mode is not good for the concentrator to autonomously collect the meter periodically. Each meter-executing task has to be initiated by the Internet of Things platform, which increases the complexity of the Internet of Things platform for the periodic metering task.

Therefore, in this embodiment, metering tasks, after set on the Internet of Things platform, are delivered to the concentrator, and the concentrator queues different metering tasks according to priorities of the metering tasks and performs asynchronous execution. In this way, the concentrator can autonomously complete a periodic task required to be executed repeatedly and then report it actively, and the Internet of Things platform is not required to initiate a task regularly each time, which reduces the workload of the Internet of Things platform, makes full use of the concentrator as an intermediate device while maintaining the integrity of core task data, and is not prone to errors. Moreover, the channel requirement may also be lowered due to the asynchronous execution, and this method is especially suitable for periodic metering tasks.

In addition, as required by data communication, the concentrator, when obtaining the first downlink data delivered by the Internet of Things platform, is also required to answer the Internet of Things platform to confirm that the data is received or not received. The concentrator answers the Internet of Things platform with an acknowledgment packet if the data is received, and with a non-acknowledgment packet if the data is not received. The answer step is a standard setting in the communication protocol, and thus is not described in detail in this embodiment.

Table 1 above shows downlink data content of a new communication protocol proposed in this embodiment. Complex periodic task execution can be satisfied through the communication protocol, so that the Internet of Things platform is required to deliver a task instruction only once, and then it can be handed over to the concentrator to complete the metering task which is repeated regularly, instead of being reissued by the Internet of Things platform each time. Moreover, different meter protocols have little impact on the concentrator, so a more compatible intercommunication manner among the Internet of Things platform, the concentrator and the target meter is realized.

Figure 2:
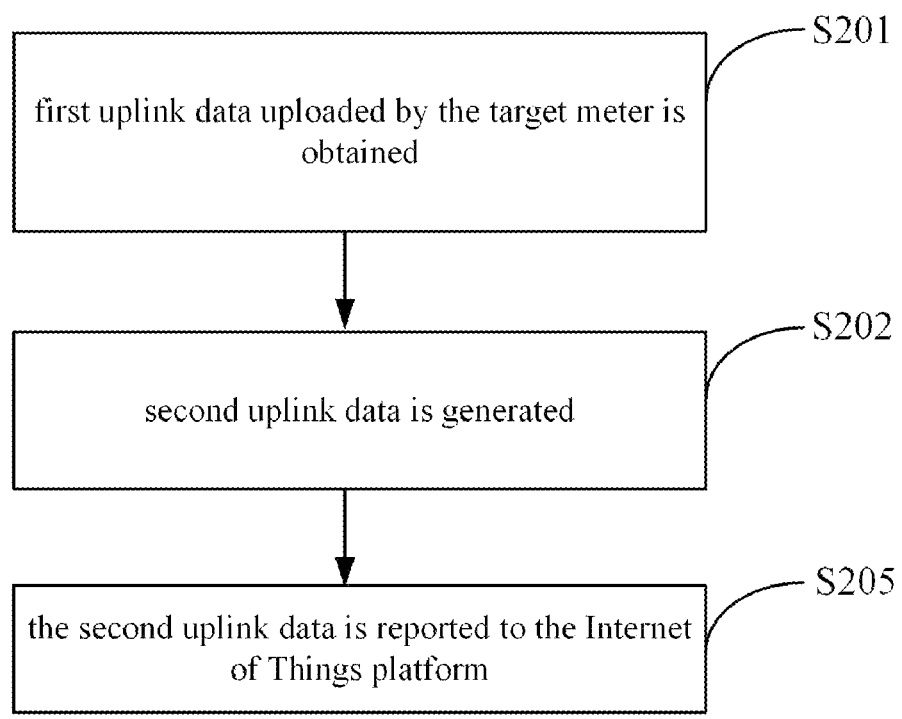
FIG. 2 is a schematic implementation flowchart of an uplink transmission step of the concentrator according to Embodiment 1 of the present disclosure.

In this embodiment, the concentrator 8, after performing the downlink transmission step, further performs an uplink transmission step. The uplink transmission step, as shown in FIG. 2, includes the following steps.

In step S201, first uplink data uploaded by the target meter is obtained the first uplink data including the communication protocol packet of the target meter and a metering task result.

In step S202, second uplink data is generated, the second uplink data including the first packet and the first uplink data.

In step S205, the second uplink data is reported to the Internet of Things platform 7.

Similarly, when a state of task completion of the meter is reported, the second uplink data can be generated by putting task packet content in the first packet into the metering task result correspondingly, and then is actively reported to the Internet of Things platform according to a report setting in the first packet.

Embodiment 2

This embodiment provides an Internet of Things data transmission system, which, as shown in FIG. 8, also includes an Internet of Things platform 7, M concentrators 8 and N meters 9, wherein M and N are natural numbers.

Figure 10:
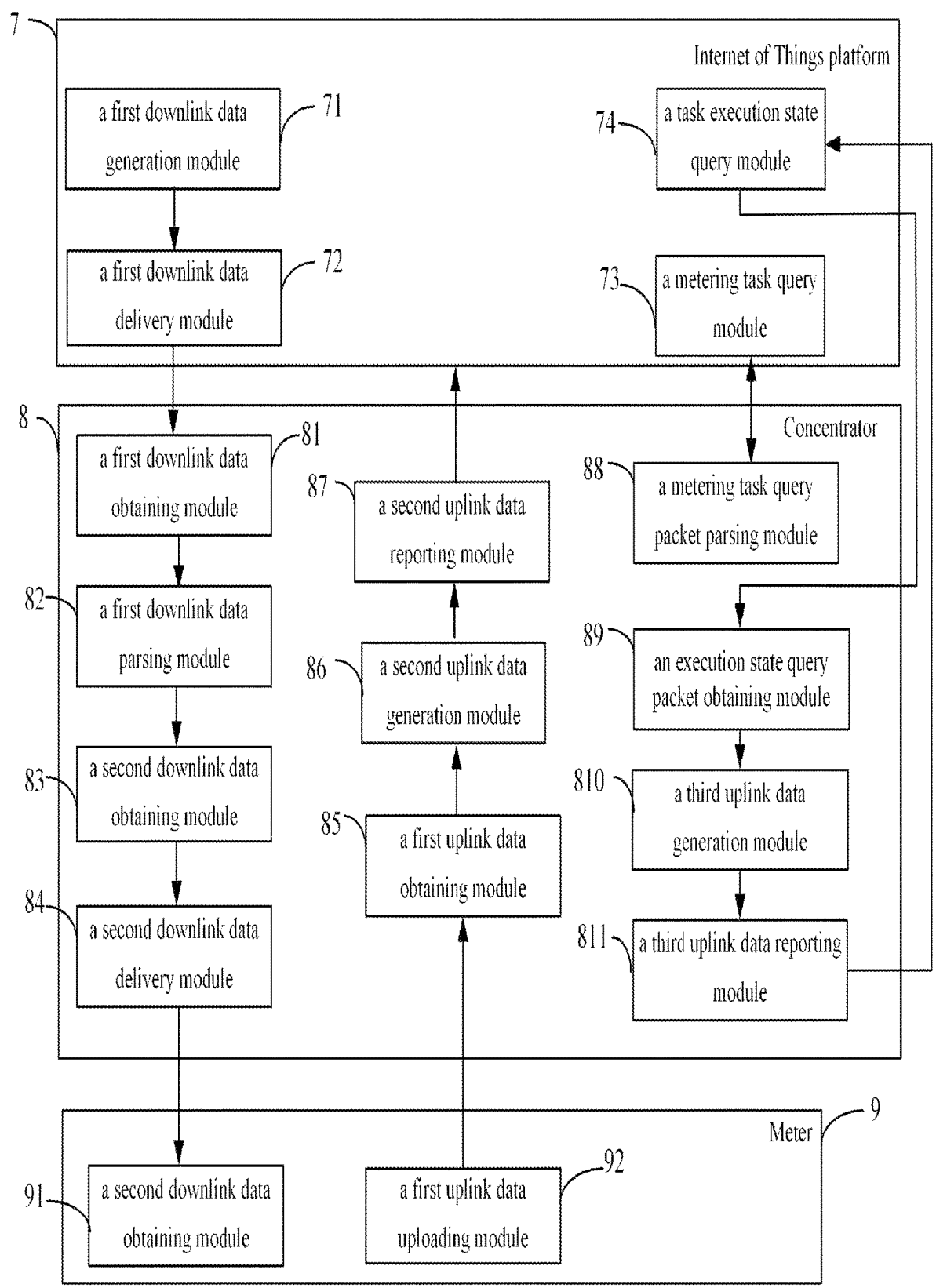
FIG. 10 is a schematic structural diagram of the Internet of Things transmission system according to Embodiment 2 of the present disclosure.

The Internet of Things platform 7 in this embodiment, referring to FIG. 10, includes a first downlink data generation module 71, a first downlink data delivery module 72, a metering task query module 73 and a task execution state query module 74. The first downlink data generation module 71 is configured to perform packet format processing on a metering task according to a first packet format to generate first downlink data. The first downlink data delivery module 72 is configured to deliver the first downlink data. The metering task query module 73 is configured to generate a metering task query packet according to a second packet format and deliver the metering task query packet to the concentrator. The task execution state query module 74 is configured to generate an execution state query packet according to a third packet format and deliver the execution state query packet to the concentrator.

The concentrator 8 includes a first downlink data obtaining module 81, a first downlink data parsing module 82, a second downlink data obtaining module 83, a second downlink data delivery module 84, a first uplink data obtaining module 85, a second uplink data generation module 86, a second uplink data reporting module 87, a metering task query packet parsing module 88, an execution state query packet obtaining module 89, a third uplink data generation module 810 and a third uplink data reporting module 811. The first downlink data obtaining module 81 is configured to obtain the first downlink data delivered by the Internet of Things platform 7. The first downlink data parsing module 82 is configured to parse the first downlink data to obtain a target meter of the metering task and a forwarding priority. The second downlink data obtaining module 83 is configured to obtain second downlink data. The second downlink data delivery module 84 is configured to send the second downlink data to the corresponding target meter according to the forwarding priority. The first uplink data obtaining module 85 is configured to obtain first uplink data uploaded by the target meter. The second uplink data generation module 86 is configured to generate second uplink data. The second uplink data reporting module 87 is configured to report the second uplink data to the Internet of Things platform 7. The metering task query packet parsing module 88 is configured to parse the metering task query packet. The execution state query packet obtaining module 89 is configured to obtain the execution state query packet of the Internet of Things platform. The third uplink data generation module 810 is configured to parse the execution state query packet and generate third uplink data according to a fourth packet format. The third uplink data reporting module 811 is configured to report the third uplink data to the Internet of Things platform.

In this embodiment, the meter 9 includes a second downlink data obtaining module 91 and a first uplink data uploading module 92, as shown in FIG. 10. The second downlink data obtaining module 91 is configured to obtain the second downlink data delivered by the concentrator 8. The first uplink data uploading module 92 is configured to upload the first uplink data to the concentrator 8.

A data transmission method in this embodiment is described below.

Firstly, the execution of specific data transmission is described from the aspect of the Internet of Things platform 7. That is, an Internet of Things data transmission method performed by the Internet of Things platform 7 includes a downlink transmission step and an uplink data transmission step. The downlink transmission step may be obtained with reference to FIG. 5, including the following steps.

In step S401, a metering task is obtained.

In step S402, packet format processing is performed on the metering task according to a first packet format and a communication protocol of a target meter to generate first downlink data.

In step S403, the first downlink data is delivered to a concentrator 8, so that the concentrator 8 obtains second downlink data by parsing and sends the second downlink data to the corresponding target meter.

Similarly, in this embodiment, the first packet format preferably includes: a number of tasks in a present frame and a first data unit format for each metering task, and the first data unit format includes: a task number, a task flag, a forwarding priority, a report flag, a storage depth, a task start time, a task cycle attribute, a task cycle interval, a task end time, a communication protocol type, a rule option, an estimated task answer length, a task packet length and task packet content.

Figure 6:
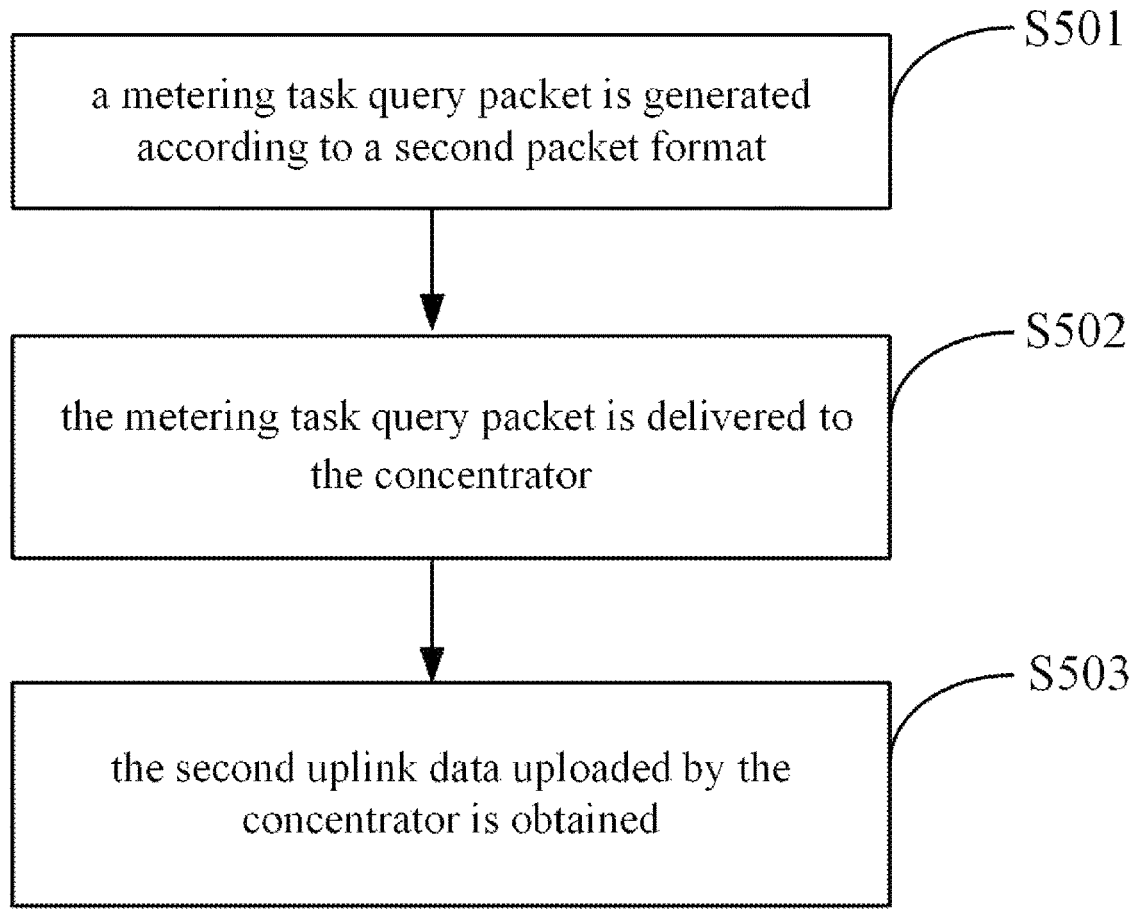
FIG. 6 is a schematic complete implementation flowchart of a step of obtaining, by the Internet of Things platform, second uplink data uploaded by the concentrator according to Embodiment 2 of the present disclosure.

In this embodiment, specific format settings of the first packet format are also shown in Table 1, Table 2 and Table 3:

Different from Embodiment 1, in this embodiment, the Internet of Things platform 7 actively collects second uplink data, which, referring to FIG. 6, specifically includes the following steps.

In step S501, a metering task query packet is generated according to a second packet format.

In step S502, the metering task query packet is delivered to the concentrator 8.

In step S503, the second uplink data uploaded by the concentrator 8 is obtained.

The second packet format includes: a number of query tasks and each to-be-queried task number, referring to Table 4 below:

TABLE 4

| Data content | Data format | Number of bytes |
| --- | --- | --- |
| Number of query tasks | BIN | 1 |
| Task number 1 | BIN | 1 |
| ... | ... | ... |
| Task number p | BIN | 1 |

Thus, the Internet of Things platform can query for a plurality of pieces of data at a time during active collection. It may also be preferably set that the number of query tasks being "0" indicates querying for all tasks at a measurement point without specifying a task number. If a specified task is queried for, a query task number is required to be filled in.

Figure 7:
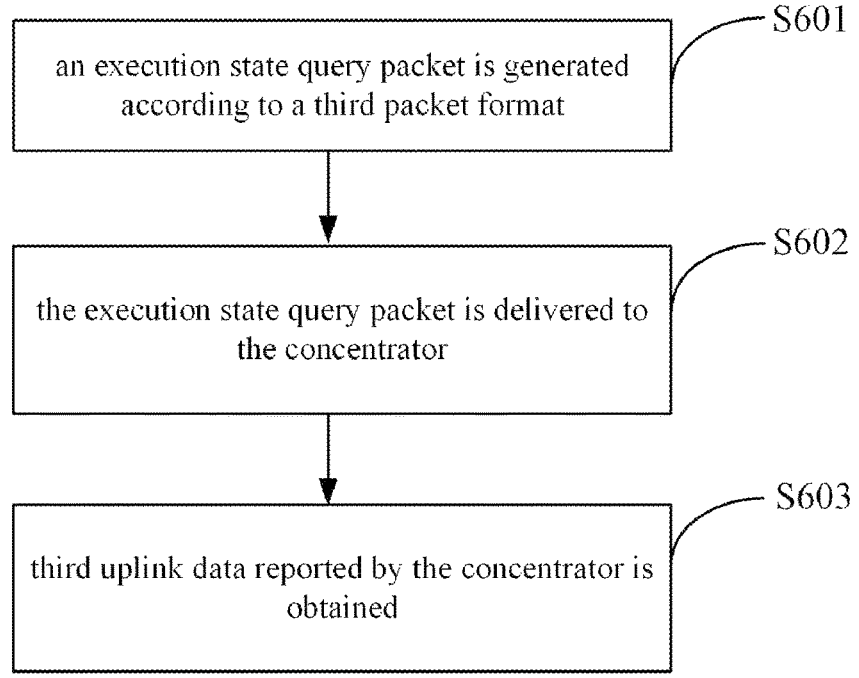
FIG. 7 is a schematic implementation flowchart of a step of querying for, by the Internet of Things platform, a task execution state according to Embodiment 2 of the present disclosure.

Also different from Embodiment 1, this embodiment further includes a step of querying for a task execution state. Referring to FIG. 7, the step of querying for a task execution state includes the following steps.

In step S601, an execution state query packet is generated according to a third packet format.

In step S602, the execution state query packet is delivered to the concentrator 8.

In step S603, third uplink data reported by the concentrator 8 is obtained, the third uplink data being generated by the concentrator 8 according to a fourth packet format.

Preferably, in this embodiment, the third packet format includes: a task number, a query start time and a query end time, referring to Table 5 below:

TABLE 5

| Data content | Data format | Number of bytes |
| --- | --- | --- |
| Task number | BIN | 1 |
| Query start time T1 | See table 2 | 5 |
| Query end time T2 | See table 2 | 5 |

That is, task execution states during the time T1 to T2 are queried for.

In this embodiment, the fourth packet format includes: a task number, a number of points in a present frame and a second data unit format for each task completed. The second data unit format includes: a task time point, a task response packet length, a task completion moment and a task response frame. Refer to Table 6 below:

TABLE 6

| Data content | Data format | Number of bytes |
| --- | --- | --- |
| Task number | BIN | 1 |
| Number of points in a | BIN | 1 |
| Task time point 1 | See table 2 | 5 |
| Task response packet | BIN | 1 |
| Task completion moment | See table 2 | 5 |
| Task response frame | BIN | L1-5 |
| ... | ... | ... |
| Task time point q | See table 2 | 5 |
| Task response packet | BIN | 1 |
| Task completion moment | See table 2 | 5 |
| Task response frame | BIN | Lq-5 |

The task response frame indicates response data during the task execution, and a number of bytes thereof is a sum of a length at a completion moment of a task packet q and a length of a response frame of the task packet q. In this embodiment, it is preferably set that if a query task is not executed, a unified response of "00" is made.

Next, the execution of specific data transmission is described from the aspect of the concentrator 8. That is, an Internet of Things data transmission method performed by the concentrator 8 includes a downlink transmission step. Referring to FIG. 1, the downlink transmission step includes the following steps.

In step S101, first downlink data delivered by an Internet of Things platform 7 is obtained, the first downlink data including a first packet generated from a first packet format, a communication protocol packet of a target meter and a metering task.

In step S102, the first downlink data is parsed to obtain a target meter of the metering task and a forwarding priority in the first packet.

In step S103, second downlink data is obtained, the second downlink data including the communication protocol packet of the target meter and the metering task.

In step S104, the second downlink data is added to an asynchronous delivery queue according to the forwarding priority.

In step S105, the second downlink data is delivered to the target meter according to the asynchronous delivery queue, so that the target meter completes the metering task.

Figure 3:
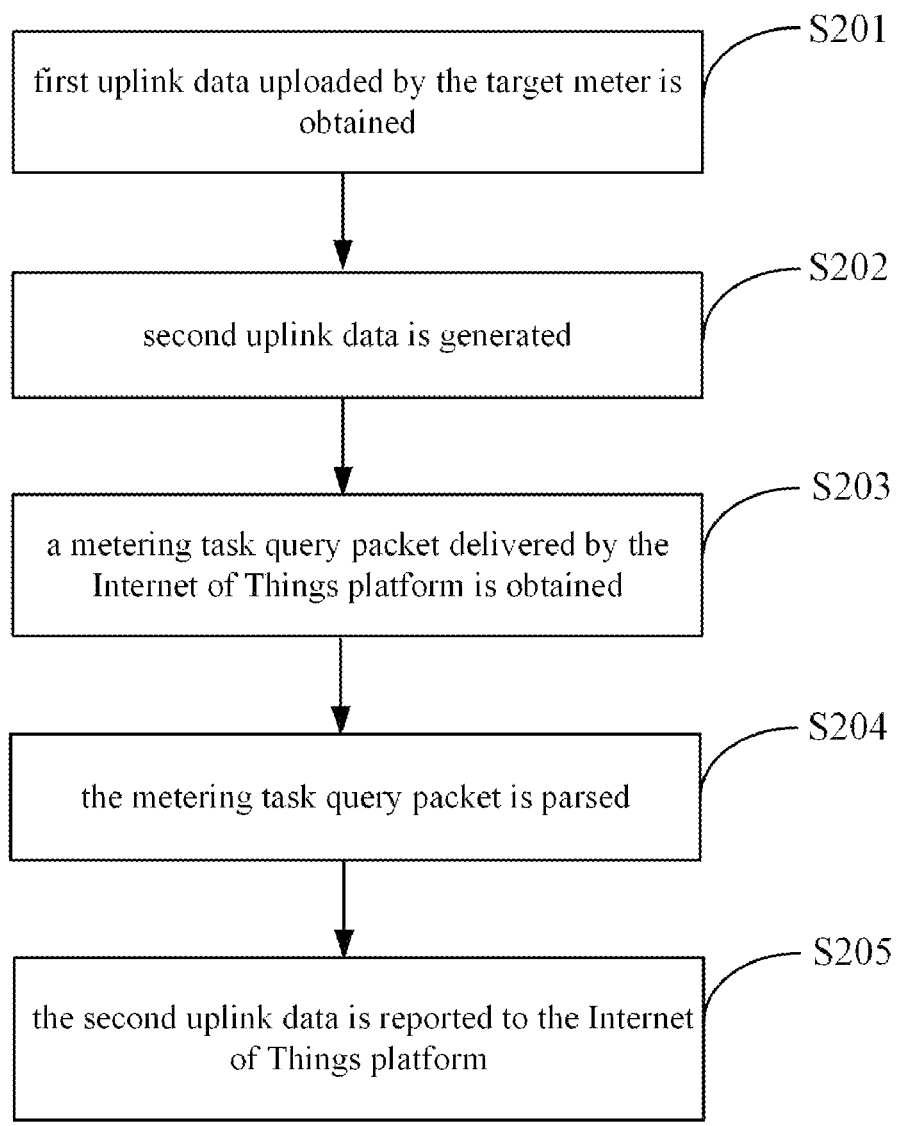
FIG. 3 is a schematic implementation flowchart of the uplink transmission step of the concentrator according to Embodiment 2 of the present disclosure.

Different from Embodiment 1, in this embodiment, after performing the downlink transmission step, the concentrator 8 passively waits for the Internet of Things platform 7 to collect the second uplink data when performing an uplink transmission step, which, referring to FIG. 3, includes the following steps.

In step S201, first uplink data uploaded by the target meter is obtained, the first uplink data including the communication protocol packet of the target meter and a metering task result.

In step S202, second uplink data is generated, the second uplink data including the first packet and the first uplink data.

In step S203, a metering task query packet delivered by the Internet of Things platform 7 is obtained, the metering task query packet being generated by the Internet of Things platform 7 according to a second packet format.

In step S204, the metering task query packet is parsed, and the corresponding second uplink data is reported to the Internet of Things platform 7.

In step S205, the second uplink data is reported to the Internet of Things platform 7.

Figure 4:
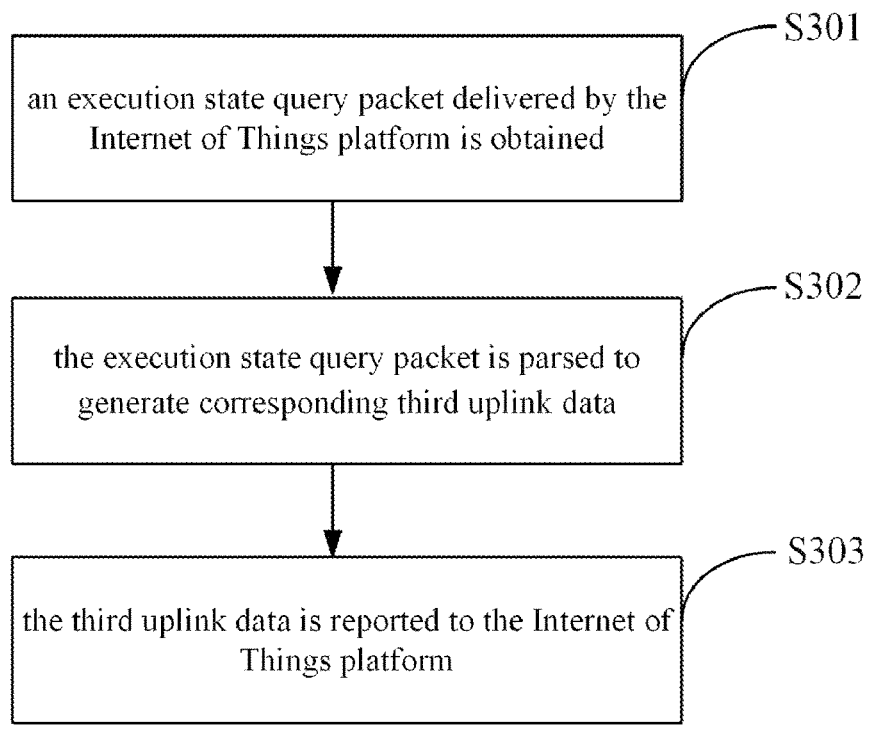
FIG. 4 is a schematic implementation flowchart of a step of answering, by the concentrator, a query of an Internet of Things platform for a task execution state according to Embodiment 2 of the present disclosure.

With reference to the step of querying for, by the Internet of Things platform 7 in this embodiment, a task execution state, after the concentrator 8 performs the downlink transmission step, a step of answering the query of the Internet of Things platform 7 for the task execution state is further included. Referring to FIG. 4, the step of answering the query of the Internet of Things platform 7 for the task execution state includes the following steps.

In step S301, an execution state query packet delivered by the Internet of Things platform 7 is obtained, the execution state query packet being generated by the Internet of Things platform 7 according to a third packet format.

In step S302, the execution state query packet is parsed to generate corresponding third uplink data, the third uplink data being generated by the concentrator 8 according to a fourth packet format.

In step S303, the third uplink data is reported to the Internet of Things platform 7.

A communication protocol is completely proposed in this embodiment, especially suitable for periodically executed metering tasks. Only through three instructions: setting a metering task (adding a first packet), querying for the metering task, and querying for a task execution state, the communication protocol can be compatible with table metering data collection of all kinds of protocols, which reduces the dependency on software of a data concentrator in a middle layer, and leaves the complexity to be handled by the Internet of Things platform with the convenience of remote operation and maintenance, modification and extension. The technical difficulty and complexity of the underlying site are reduced, and the impact of the underlying instability on the success rate of data collection and the data quality is prevented. The hardware interface of the concentrator, protocol compatibility of the Internet of Things platform and completeness of protocol implementation are emphasized.

It may be clearly understood by those skilled in the art that, for convenient and brief description, division of the foregoing functional modules and modules is used as an example for illustration. In practical application, the foregoing functions can be allocated to different functional units and modules and implemented as required, that is, an internal structure of the apparatus is divided into different functional units or modules to accomplish all or some of the functions described above. Certainly, the foregoing units and modules may also be replaced by a processor including a computer program to complete the work of each part in a form of pure software. The functional units or modules in the embodiments may be integrated into one processing unit, or each of the units may exist alone physically, or two or more units are integrated into one unit, and the integrated unit may be implemented in a form of hardware, or may also be implemented in a form of a software functional unit. In addition, specific names of all the functional units or modules are merely for facilitating the differentiation between each other, but are not intended to limit the protection scope of the present application. For a specific working process of the units and modules in the foregoing system, reference may be made to the corresponding process in the foregoing method embodiments, which is not repeatedly described herein. In the foregoing embodiments of the present invention, the description of each embodiment has its own emphasis. For a part not detailed or described in one embodiment, reference may be made to relevant description of other embodiments.

Those of ordinary skill in the art should be aware of that, units and algorithms steps in the examples described with reference to the embodiments disclosed herein may be implemented in a form of electronic hardware or a combination of computer software and electronic hardware. Whether the functions are performed by hardware or hardware depends on particular applications and design constraints of the technical solutions. Those skilled in the art may use different methods to implement the described functions for each particular application, but it should not be considered that the implementation goes beyond the scope of the present disclosure.

In the embodiments provided in the present disclosure, it should be understood that the apparatus/terminal device and method disclosed may be implemented in other manners. For example, the described embodiment of the apparatus/terminal device is merely exemplary. For example, the division of the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms. The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may also be implemented in a form of a software functional unit. The integrated module/unit may be stored in a computer-readable storage medium if it is implemented in the form of the software functional unit and sold or used as a separate product. Based on such an understanding, all or some of the processes implemented in the above embodiments of the present disclosure may also be completed by a computer program to instruct related hardware. The computer program may be stored in a computer-readable storage medium. The steps in the foregoing method embodiments may be implemented when the computer program is executed by a processor. The computer program includes computer program code, which may be in a form of source code, object code, an executable file or in some intermediate forms. The computer-readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), an electrical carrier signal, a telecommunication signal, a software distribution medium, and so on. It should be noted that content included in the computer-readable medium may be appropriately increased or decreased according to requirements of legislation and patent practice in a jurisdiction, for example, in some jurisdictions, according to legislation and patent practice, the computer-readable medium does not include an electrical carrier signal and a telecommunication signal.

The above embodiments are only intended to illustrate rather than limiting the technical solutions of the present disclosure. Although the present disclosure has been described in detail with reference to the foregoing embodiments, it will be understood by those of ordinary skill in the prior art that the technical solutions described in the foregoing embodiments may be modified, or some technical features may be replaced by equivalents; and such modifications or replacements do not cause the corresponding technical solutions to depart from the spirit and scope of the technical solutions of the embodiments of the present disclosure, and should fall within the protection scope of the present disclosure.

What is claimed is:

1. An Internet of Things data transmission method, comprising a downlink transmission step, the downlink transmission step comprising:
    obtaining first downlink data delivered by an Internet of Things platform, the first downlink data comprising a first packet generated from a first packet format, a communication protocol packet of a target meter and a metering task;
    parsing the obtained first downlink data to obtain a target meter of the metering task and a forwarding priority in the first packet;
    obtaining second downlink data from the obtained first downlink data, after parsing the obtained first downlink data, the second downlink data comprising the communication protocol packet of the target meter and the metering task;
    adding the obtained second downlink data to an asynchronous delivery queue according to the forwarding priority; and
    delivering the added second downlink data to the target meter according to the asynchronous delivery queue, so that the target meter completes the metering task, and
    an uplink transmission step after the downlink transmission step, the uplink transmission step comprising:
    obtaining first uplink data uploaded by the target meter, the first uplink data comprising the communication protocol packet of the target meter and a metering task result;
    generating second uplink data, the second uplink data comprising the first packet and the first uplink data; and
    reporting the second uplink data to the Internet of Things platform.
2. The Internet of Things data transmission method according to claim 1, wherein the first packet format comprises: a number of tasks in a present frame and a first data unit format for each metering task.
3. The Internet of Things data transmission method according to claim 2, wherein the first data unit format comprises at least one of the following: a task number, a task flag, a forwarding priority, a report flag, a storage depth, a task start time, a task cycle attribute, a task cycle interval, a task end time, a communication protocol type, a rule option, an estimated task answer length, a task packet length and task packet content;
    and the first data unit format comprises at least the forwarding priority.
4. The Internet of Things data transmission method according to claim 1, wherein the step of reporting the second uplink data to the Internet of Things platform comprises:
    obtaining a metering task query packet delivered by the Internet of Things platform, the metering task query packet being generated by the Internet of Things platform according to a second packet format; and
    parsing the metering task query packet, and reporting the corresponding second uplink data to the Internet of Things platform.
5. The Internet of Things data transmission method according to claim 1, wherein a step of answering a query of the Internet of Things platform for a task execution state is further comprised after the downlink transmission step, and the step of answering a query of the Internet of Things platform for a task execution state comprises:
    obtaining an execution state query packet delivered by the Internet of Things platform, the execution state query packet being generated by the Internet of Things platform according to a third packet format;
    parsing the execution state query packet to generate corresponding third uplink data, the third uplink data being generated by a concentrator according to a fourth packet format; and
    reporting the third uplink data to the Internet of Things platform.
6. The Internet of Things data transmission method according to claim 5, wherein the third packet format comprises: a task number, a query start time and a query end time; and
    the fourth packet format comprises: a task number, a number of points in a present frame and a second data unit format for each task completed.
7. The Internet of Things data transmission method according to claim 6, wherein the second data unit format comprises: a task time point, a task response packet length, a task completion moment and a task response frame.
8. An Internet of Things data transmission method, comprising a downlink transmission step and an uplink transmission step, wherein the downlink transmission step comprises:
    obtaining a metering task;
    performing packet format processing on the metering task according to a first packet format and a communication protocol of a target meter to generate first downlink data, the first downlink data comprising a first packet generated from the first packet format, a communication protocol packet of the target meter and the metering task; and
    delivering the first downlink data to a concentrator, so that the concentrator obtains second downlink data by parsing and sends the second downlink data to the corresponding target meter, wherein the second downlink data comprises the communication protocol packet of the target meter and the metering task; and the uplink transmission step comprises:

obtaining a second uplink data uploaded by the concentrator;

the second uplink data comprising the first packet generated from the first packet format, the communication protocol packet of the target meter and a metering task result, the first packet format comprises: a number of tasks in a present frame and a first data unit format for each metering task, the first data unit format comprises at least one of the following: a task number, a task flag, a forwarding priority, a report flag, a storage depth, a task start time, a task cycle attribute, a task cycle interval, a task end time, a communication protocol type, a rule option, an estimated task answer length, a task packet length and task packet content;

and the first data unit format comprises at least the forwarding priority.

9. The Internet of Things data transmission method according to claim 8, wherein the step of obtaining a second uplink data uploaded by the concentrator comprises:

generating a metering task query packet according to a second packet format;

delivering the metering task query packet to the concentrator; and obtaining the second uplink data reported by the concentrator.

10. The Internet of Things data transmission method according to claim 8, wherein the Internet of Things data transmission method further comprises a step of querying a task execution state, and the step of querying a task execution state comprises:

generating an execution state query packet according to a third packet format;

delivering the execution state query packet to the concentrator; and obtaining third uplink data reported by the concentrator, the third uplink data being generated by the concentrator according to a fourth packet format.

11. The Internet of Things data transmission method according to claim 10, wherein the third packet format comprises: a task number, a query start time and a query end time; and the fourth packet format comprises: a task number, a number of points in a present frame and a second data unit format for each task completed.

12. An Internet of Things data transmission system, comprising an Internet of Things platform, M concentrators and N meters, wherein M and N are natural numbers, and the Internet of Things platform comprises:

a first downlink data generation processor configured to perform packet format processing on a metering task according to a first packet format to generate first downlink data;

the first downlink data comprising a first packet generated from the first packet format, a communication protocol packet of a target meter and the metering task; and a first downlink data delivery processor configured to deliver the generated first downlink data to the concentrator; and the concentrator comprises:

a first downlink data obtaining processor configured to obtain the first downlink data delivered by the Internet of Things platform;

a first downlink data parsing processor configured to parse the obtained first downlink data to obtain a target meter of the metering task and a forwarding priority;

a second downlink data obtaining processor configured to obtain second downlink data from the obtained first downlink data, after parsing the obtained first downlink data, the second downlink data comprising the communication protocol packet of the target meter and the metering task;

a second downlink data delivery processor configured to send the obtained second downlink data to the corresponding target meter according to the forwarding priority;

a first uplink data obtaining processor configured to obtain first uplink data uploaded by the target meter, after the obtained second downlink data are sent to the corresponding target meter according to the forwarding priority, the first uplink data comprising the communication protocol packet of the target meter and a metering task result;

a second uplink data generation processor configured to generate second uplink data, the second uplink data comprising the first packet and the first uplink data obtained from the first uplink data obtaining processor; and a second uplink data reporting processor configured to report the generated second uplink data to the Internet of Things platform.

* * * * *